United States Patent
Shin et al.

(10) Patent No.: US 12,210,703 B1
(45) Date of Patent: Jan. 28, 2025

(54) INVERSE CAPACITIVE TOUCH SENSING ON A HEADSET

(71) Applicant: Google LLC, Mountain View, CA (US)

(72) Inventors: Dongeek Shin, San Jose, CA (US); Lidan Mu, Mountain View, CA (US); Seyed Farbod Taghizadeh Motlagh, Seattle, WA (US); Anuva Kulkarni, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/361,457

(22) Filed: Jul. 28, 2023

(51) Int. Cl.
*G06F 3/045* (2006.01)
*G06F 3/01* (2006.01)
*G06F 3/041* (2006.01)
*G06F 3/044* (2006.01)
*G06N 3/0464* (2023.01)
*G06F 3/042* (2006.01)

(52) U.S. Cl.
CPC .......... *G06F 3/04162* (2019.05); *G06F 3/012* (2013.01); *G06F 3/017* (2013.01); *G06F 3/04166* (2019.05); *G06F 3/0447* (2019.05); *G06N 3/0464* (2023.01); *G06F 3/042* (2013.01); *G06F 2203/04102* (2013.01); *G06F 2203/04106* (2013.01)

(58) Field of Classification Search
CPC ...... G06F 3/012; G06F 3/017; G06F 3/04162; G06F 3/04166; G06F 3/042; G06F 3/0447; G06F 3/0464; G06F 2203/04102; G06F 2203/04106; G02B 27/017; G02B 2027/0178
See application file for complete search history.

(56) References Cited

U.S. PATENT DOCUMENTS

| | | | |
|---|---|---|---|
| 11,163,161 B2 * | 11/2021 | Woodman | H04N 23/55 |
| 11,762,204 B2 * | 9/2023 | Breugelmans | G02B 27/0101 345/8 |
| 11,934,586 B2 * | 3/2024 | Shin | G06F 1/163 |
| 2013/0249849 A1 | 9/2013 | Wong et al. | |
| 2015/0277123 A1 * | 10/2015 | Chaum | G09G 3/02 348/62 |
| 2017/0147077 A1 * | 5/2017 | Park | G06F 21/32 |
| 2017/0199560 A1 | 7/2017 | Milford | |
| 2019/0265473 A1 * | 8/2019 | Shahmohammadi | G02B 27/017 |
| 2023/0214064 A1 * | 7/2023 | Wang | G02B 27/017 345/173 |

FOREIGN PATENT DOCUMENTS

| | | |
|---|---|---|
| KR | 102081809 B1 | 2/2020 |
| WO | WO-2024049110 A1 * | 3/2024 |

\* cited by examiner

*Primary Examiner* — Joe H Cheng

(74) *Attorney, Agent, or Firm* — Brake Hughes Bellermann LLP

(57) ABSTRACT

A headset in the form of glasses for use in creating an augmented reality experience is implemented with a capacitive smart sensor disposed on an inside surface of an arm of the glasses. The capacitive smart sensor can be trained, using a neural network, to identify and distinguish different gestures associated with a touch event on an outside surface of the arm of the glasses. The smart sensor thus transforms the headset into a user input device without adding a touch pad.

20 Claims, 16 Drawing Sheets

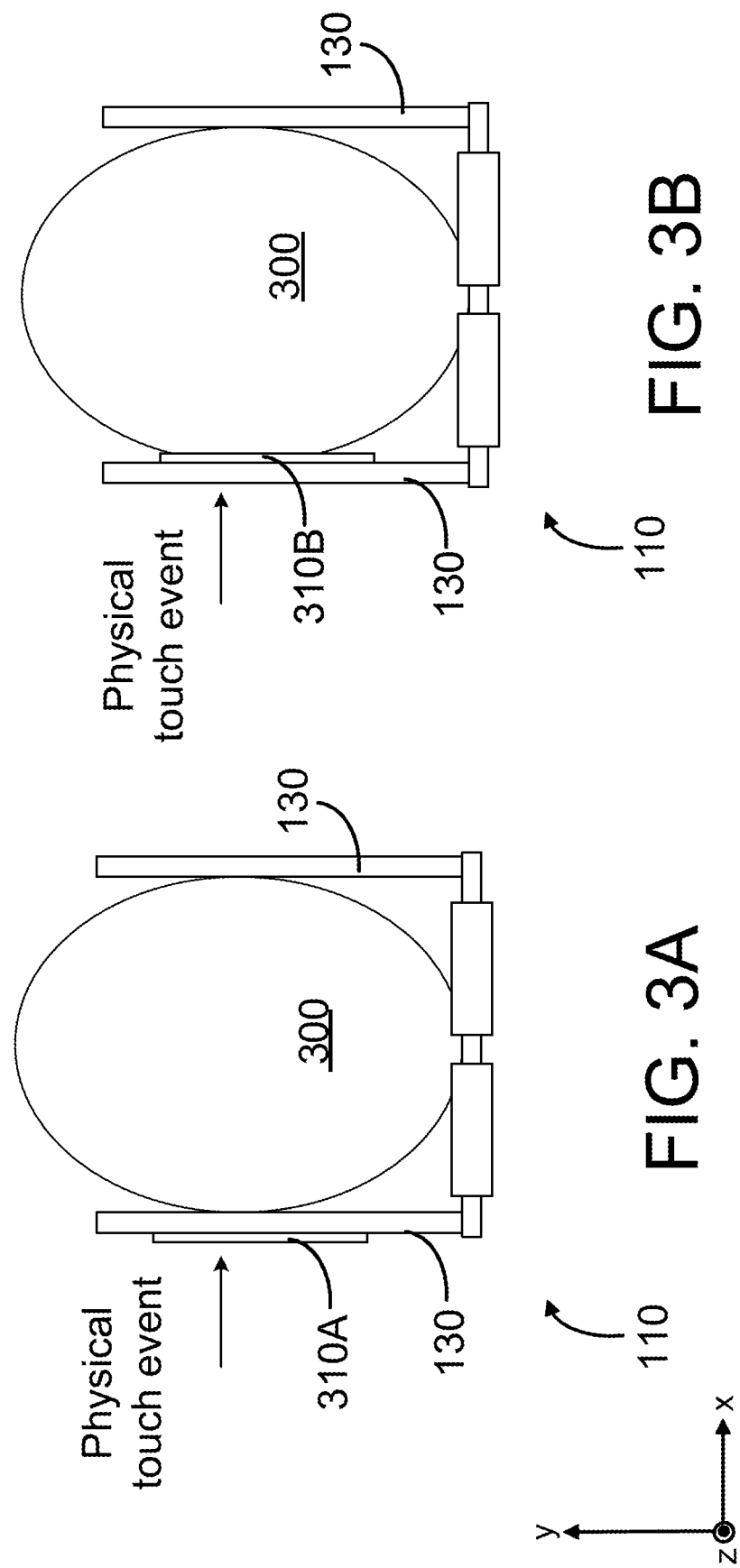

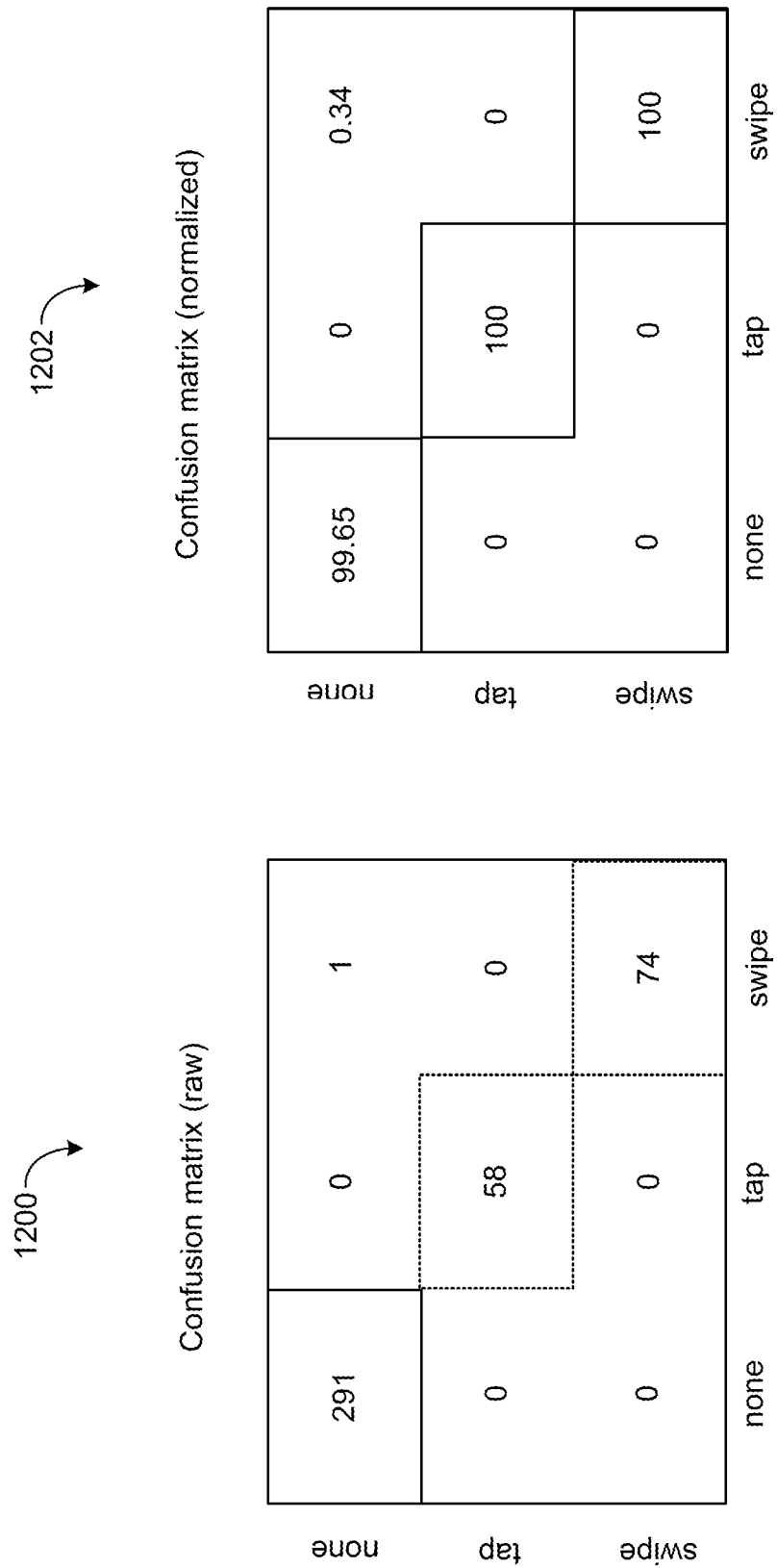

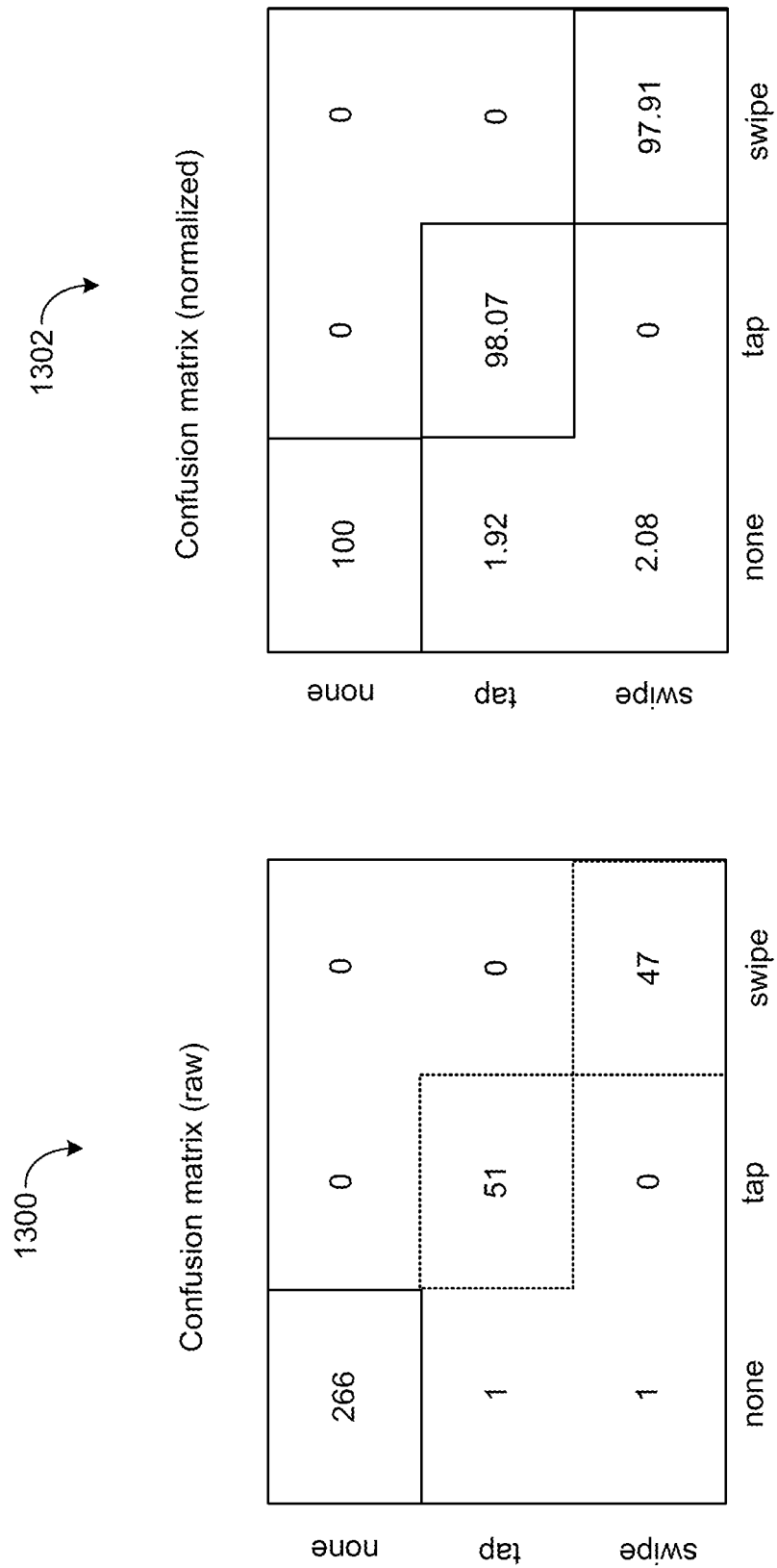

INVERSE CAPACITIVE TOUCH SENSING ON A HEADSET

FIELD OF THE DISCLOSURE

The present disclosure relates to a user interface for an augmented reality (AR) or virtual reality (VR) headset.

BACKGROUND

Augmented reality (AR) technology overlays digital content onto a real-world environment to provide an immersive experience for a user. Head-mounted wearable devices for AR/VR may include, for example, ear buds and head-mounted eyewear (e.g., headsets) such as smart glasses or goggles. Cameras and inertial measurement units (IMUs) can be disposed on the headset, and images can be projected onto a lens of the headset, providing a heads-up display (HUD). Headsets and other wearable computing devices may include various types of electronic components for computation and both long-range and short-range radio frequency (RF) wireless communication.

SUMMARY

One technical problem with smart headsets is that of communicating commands from the user to the headset controller. AR glasses lack the surface area needed to incorporate a touch screen as an input device. Adding a dedicated user interface such as a touch pad would add weight and cost to the headset, and such additional hardware would need to be tested and integrated into the headset design. The present disclosure describes methods and devices that address such user interface challenges for AR/VR headsets.

In some aspects, the techniques described herein relate to a headset, including: a rigid headset frame including a lens frame portion and an arm having an inside surface and an outside surface; a touch sensor coupled to the inside surface of the arm; and a microprocessor configured as a convolutional neural network (CNN) to detect user gestures on the outside surface using the touch sensor; and distinguish multiple types of user gestures from one another based on machine learning.

In some aspects, the techniques described herein relate to a headset, wherein the inside surface is located adjacent to a user's head when the headset is worn by the user.

In some aspects, the techniques described herein relate to a headset, wherein the rigid headset frame is an eyeglasses frame suitable for use in an augmented reality system.

In some aspects, the techniques described herein relate to a headset, wherein the rigid headset frame is a goggles frame suitable for use in a virtual reality system.

In some aspects, the techniques described herein relate to a headset, wherein the rigid headset frame is made of a material that includes at least one of a plastic material, a nylon material, and a carbon fiber material.

In some aspects, the techniques described herein relate to a headset, wherein the touch sensor includes at least one of a capacitive specific absorption rate (SAR) sensor, an optical proximity sensor, or a microphone.

In some aspects, the techniques described herein relate to a headset, further including a radio frequency communication device coupled to the touch sensor.

In some aspects, the techniques described herein relate to a headset, wherein the touch sensor is configured as an on/off switch that controls an operational state of the headset.

In some aspects, the techniques described herein relate to a headset, wherein the touch sensor includes a copper backplate.

In some aspects, the techniques described herein relate to a system, including: a headset; a capacitive sensor mounted to an inside surface of the headset, the inside surface located adjacent to a user's head when the headset is worn by a user; a radio frequency (RF) communication device coupled to the capacitive sensor, the RF communication device configured to transmit RF signals representing user movements; and a microprocessor communicatively coupled to the capacitive sensor by the RF communication device, the microprocessor programmed with a neural network configured to interpret the RF signals received from the capacitive sensor.

In some aspects, the techniques described herein relate to a system, wherein the RF signals representing user movements are transmitted on each of two channels.

In some aspects, the techniques described herein relate to a system, wherein the neural network is configured to distinguish between a gesture signal and a head movement signal.

In some aspects, the techniques described herein relate to a system, wherein the neural network is configured to distinguish between a tap gesture signal and a swipe gesture signal.

In some aspects, the techniques described herein relate to a method, including: attaching a capacitive touch sensor to an inside surface of a headset frame; coupling the capacitive touch sensor to a microprocessor via a radio frequency (RF) link; configuring the microprocessor as a CNN; detecting user motion signals via the capacitive touch sensor; communicating a prescribed set of user motion signals as test signals to the CNN via the RF link; and using machine learning, training the CNN to distinguish from among different types of test signals.

In some aspects, the techniques described herein relate to a method, wherein training the CNN includes constructing confusion matrices corresponding to the different types of test signals.

In some aspects, the techniques described herein relate to a method, wherein the different types of test signals include at least one of head motion signals or gesture signals.

In some aspects, the techniques described herein relate to a method, wherein the gesture signals include at least one of tap gestures or swipe gestures.

In some aspects, the techniques described herein relate to a method, wherein the head motion signals include at least one of walking motion signals or talking motion signals.

In some aspects, the techniques described herein relate to a method, further including: communicating real time user motion signals to the CNN via the RF link; and distinguishing head motion signals from gesture signals based on the machine learning.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

FIGS. 3A and 3B are top plan views of smart glasses, showing placement options for a capacitive SAR sensor, according to a possible implementation of the present disclosure.

FIGS. 12A and 12B are confusion matrices for a training phase of the neural network model.

FIGS. 13A and 13B are confusion matrices for a testing phase of the neural network model.

The components in the drawings are not necessarily to scale relative to each other. Like reference numerals designate corresponding parts throughout the several views.

DETAILED DESCRIPTION

An AR/VR headset may incorporate a small touch sensor as an on/off switch (e.g., device on/device off, or "don/doff"). In some implementations, the touch sensor is located on an arm of the headset. Touch sensors can be implemented as capacitive touch sensors, proximity sensors, or microphones that amplify the sound of a touch event. A capacitive touch sensor senses displacement of a membrane or diaphragm by an associated change in capacitance.

In some implementations, the don/doff sensor can be placed on an outside surface of the arm of the headset. The presence of a human finger touching a surface can be detected by a type of capacitive sensor that measures the specific absorption rate (SAR), or the rate at which energy is absorbed by the human body when exposed to the radio frequency (RF) electromagnetic field (EMF) of an electronic device. In some implementations, the don/doff sensor can be placed on an inside surface of the arm of the headset. The presence of a human head in proximity to the capacitive SAR sensor is enough to trigger the sensor to detect a "device on" state when a user dons the headset, without a need to actually touch the sensor.

When a capacitive SAR sensor is placed in proximity to a human head, which is a large object compared to the size of the sensor, there is a large capacitive shift in response to a small displacement of the sensor, which means the sensor becomes highly sensitive to a touch event. Placing a capacitive SAR sensor on an inside surface of the arm of the headset, e.g., AR glasses, thus presents an opportunity for distinguishing different finger gestures that can be communicated by a single touch sensor. Because the AR glasses have a rigid structure, touch events on the outside of the glasses arm can be sensed by the capacitive SAR sensor on the inside of the glasses arm. Such touch events can include finger gestures such as a finger tap and a finger swipe. The ability to detect finger gestures, and then to distinguish a finger tap from a finger swipe, provides a sufficient user interface for AR glasses without having to incorporate a separate touchpad, or any additional hardware.

This ability of the capacitive SAR sensor to distinguish different gestures can be provided by a convolutional neural network (CNN) programmed using machine learning. Early model experiments have indicated that using a capacitive SAR sensor, in combination with the CNN, to sense tap and swipe gestures is resilient to false positives, and does not interfere with the use of the touch sensor as a don/doff switch.

Figure 1:
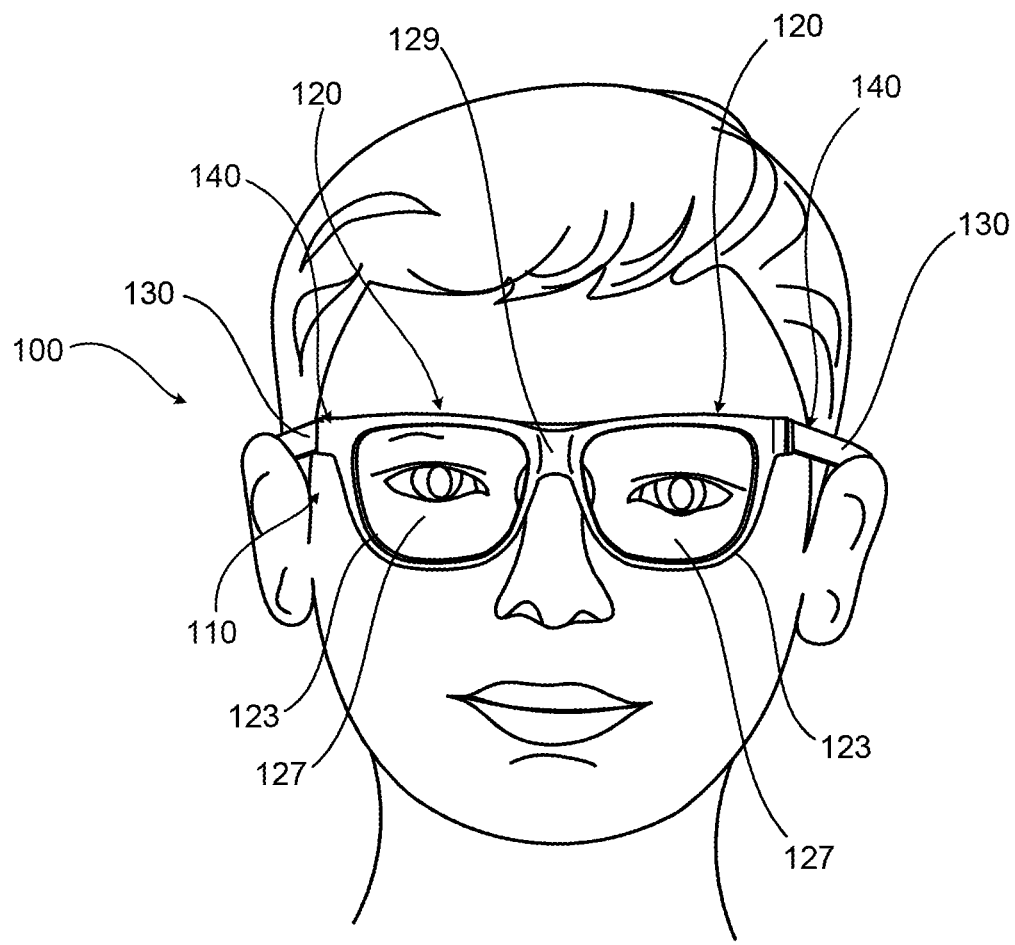
FIG. 1 is a pictorial view of a user wearing smart glasses, according to a possible implementation of the present disclosure.

FIG. 1 illustrates a user wearing a head-mounted wearable display 100 in the form of smart glasses, or VR/AR glasses. In some implementations, the head-mounted wearable display 100 can be in the form of VR/AR goggles or another alternative style headset. In some implementations, the head-mounted wearable display 100 can include at least one of display capability, touch sensing, eye/gaze tracking capability, sound amplification capability, computing/processing capability, and RF communications capability.

The example head-mounted wearable display 100 as shown in FIG. 1 includes a frame 110. The frame 110 includes a front frame portion 120, and a pair of temple arm portions 130 rotatably coupled to the front frame portion 120 by respective hinges 140. The front frame portion 120 includes rim portions 123 surrounding respective optical elements in the form of lenses 127, with a bridge portion 129 connecting the rim portions 123. The temple arm portions 130 are coupled, for example, pivotably or rotatably coupled, to the front frame portion 120 at peripheral portions of the respective rim portions 123. In some examples, the lenses 127 are corrective/prescription lenses. In some examples, the lenses 127 include an optical material such as glass and/or plastic optical elements that do not necessarily incorporate corrective/prescription parameters. In some implementations, the frame 110 is a rigid frame that moves as a unit in response to a touch event on any one of the frame portions. The rigid frame can include, for example, a plastic material, a nylon material, or a carbon fiber material, or combinations thereof.

Figure 2:
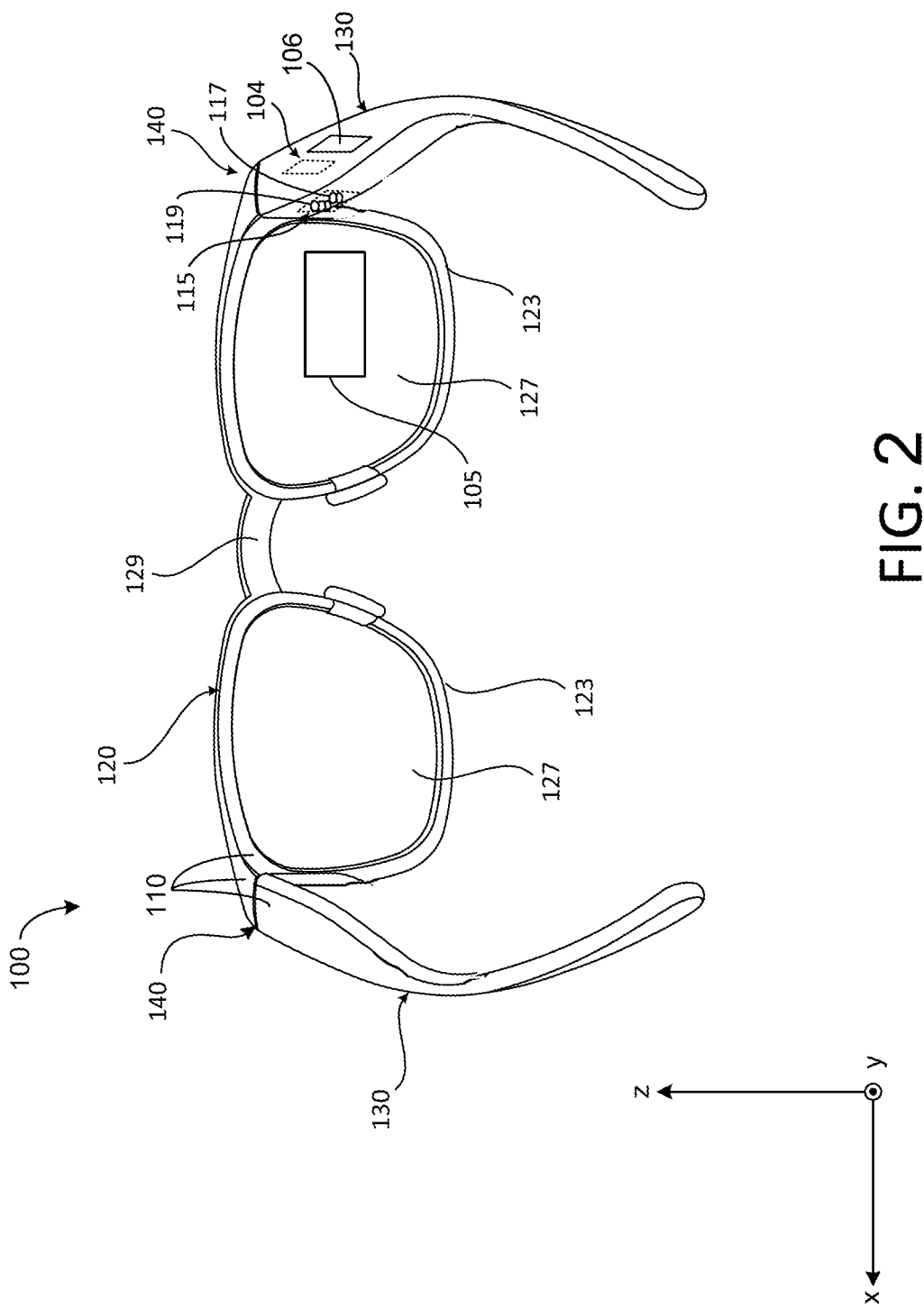
FIG. 2 is a rear view of the smart glasses, according to a possible implementation of the present disclosure.

FIG. 2 is a rear view of the example head-mounted wearable display 100 shown in FIG. 1. In some examples, the head-mounted wearable display 100 includes a display device 104 that can output visual content, for example, at an output coupler 105, so that the visual content is visible to the user as a heads-up display. In the example shown in FIG. 2, the display device 104 is provided in one of the two arm portions 130, simply for purposes of discussion and illustration. Display devices 104 may be provided in each of the two arm portions 130 to provide for binocular output of content.

In some examples, the head-mounted wearable display 100 includes one or more of a sensor 106, a controller 115, and a communications module 117. One or more of the sensor 106, the controller 115 and the communications module 117 can be powered by a battery 119 housed in the frame of the head-mounted wearable display 100. The battery 119 can be, for example, a lithium-ion rechargeable battery. In some examples, the controller 115 may include one or more central processing units (CPUs) and/or one or more graphics processing units (GPUs) operably coupled to the communications module 117. In some examples, the communications module 117 can include an RF headset transceiver, providing for communication and exchange of information between the head-mounted wearable display 100 and other external devices. In some implementations, the transceiver includes a receiver and a transmitter configured to operate in different bands, or frequency ranges, depending on the type or location of the external devices. For example, the head-mounted wearable display 100 may communicate with an external device using short-range signals, e.g., Bluetooth™ and with the server computing system 1500 using longer-range RF signals such as WiFi or 4G/5G. In some implementations, the RF headset transceiver communicates signals from the sensor 106 to an external microprocessor. In some implementations, the RF headset transceiver communicates signals from the sensor 106 on multiple channels.

FIGS. 3A and 3B are top plan views of the frame 110 of the head-mounted wearable display 100, when worn on a user's head 300, according to some implementations of the present disclosure. As shown in FIGS. 3A and 3B, the frame 110 as a whole can be used as an input device when equipped with a touch sensor. FIG. 3A shows the sensor 106 implemented as a capacitive SAR sensor 310A disposed on an outside surface of the arm portion 130 of the frame 110. The capacitive SAR sensor 310A is positioned to detect the presence of the user's finger in contact with the outside surface of the sensor. FIG. 3B shows the sensor 106 implemented as a capacitive SAR sensor 310B disposed on, e.g., mounted to or attached to, an inside surface of the arm portion 130 of the head-mounted wearable display 100. The capacitive SAR sensor 310B is positioned to detect the presence of the user's head relative to the inside surface of the sensor. Thus, in FIG. 3B, the sensing element is on the opposite side of the arm portion 130 from where the touch event occurs.

The capacitive SAR sensor 310B, positioned as shown in FIG. 3B, can be referred to as an inverse touch sensor. In some implementations, the capacitive SAR sensor 310B has a minimum dimension that can distinguish gestures, e.g., a minimum length along the arm portion 130, in a range of about 3 cm to about 4 cm. When the user touches anywhere on the outside surface of the arm portion 130, as shown in both FIG. 3A and FIG. 3B, the head-mounted wearable display 100 moves as a unit in the same direction relative to the user's head 300, regardless of the position or size of the capacitive SAR sensor. Put differently, the AR glasses, being rigid, are displaced by a touch event in the same way in FIG. 3A as in FIG. 3B. However, in FIG. 3B, the capacitive SAR sensor 310B deforms freely, relative to the user's head 300 in response to the touch event, whereas deformation of the capacitive SAR sensor 310A in FIG. 3A, relative to the user's head, is blocked by the arm portion 130. Therefore, the capacitive SAR sensor 310B senses the touch event differently than does the capacitive SAR sensor 310A, due to the difference in its position. For example, the capacitive SAR sensor 310B, having an extended "field of view," may be more sensitive to the touch event than the capacitive SAR sensor 310A. In some implementations, the capacitive SAR sensor 310B may be able to sense the touch event while the capacitive SAR sensor 310A may or may not sense the touch event. In addition, the capacitive SAR sensor 310B, together with the CNN, may be resilient to detecting false positive gesture signals because such gesture signals observed during a touch event can reveal a unique signature relative to signals that correspond to other actions. The CNN is used to decode e.g., interpret, such gesture signals using a decision matrix as described further below. In some implementations, the outcome of the CNN decision can be confirmed by an optional selection on the heads-up display. In some implementations, the capacitive SAR sensor 310B can include a copper backplate to remove external capacitive readings so that when the user touches the outside surface of the arm portion 130 while wearing the AR glasses, the don/doff switch will not respond.

Figure 4A:
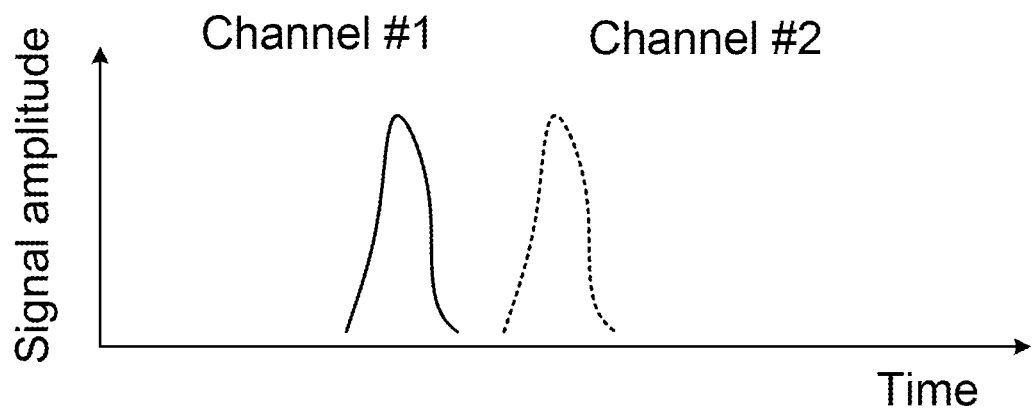
FIGS. 4A and 4B are time plots of signals received from the capacitive SAR sensor, according to a possible implementation of the present disclosure.
Figure 4B:
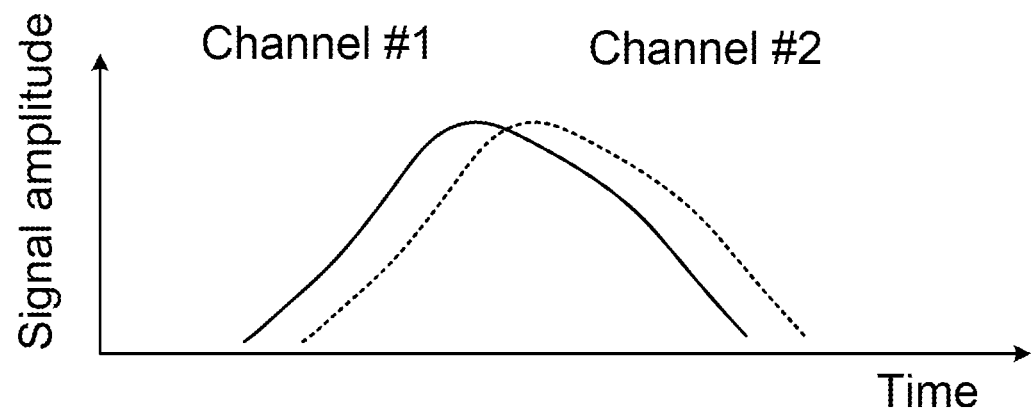

FIGS. 4A and 4B are time plots of signal amplitude for each of two channels, according to some implementations of the present disclosure. During a touch event, a differential capacitance signal can be measured by the capacitive SAR sensor 310B using each of two channels: channel 1 and channel 2. FIG. 4A shows instantaneous, discrete signals measured on channel 1 and channel 2 that are non-overlapping in time. For example, the signal sensed on channel 1 may precede the signal sensed on channel 2. FIG. 4B shows signals measured on channel 1 and on channel 2 that are extended in time, such that the signal profiles sensed on the two channels overlap. The signals shown in FIGS. 4A and 4B can be transmitted as RF signals by the communications module 117.

Figure 5:
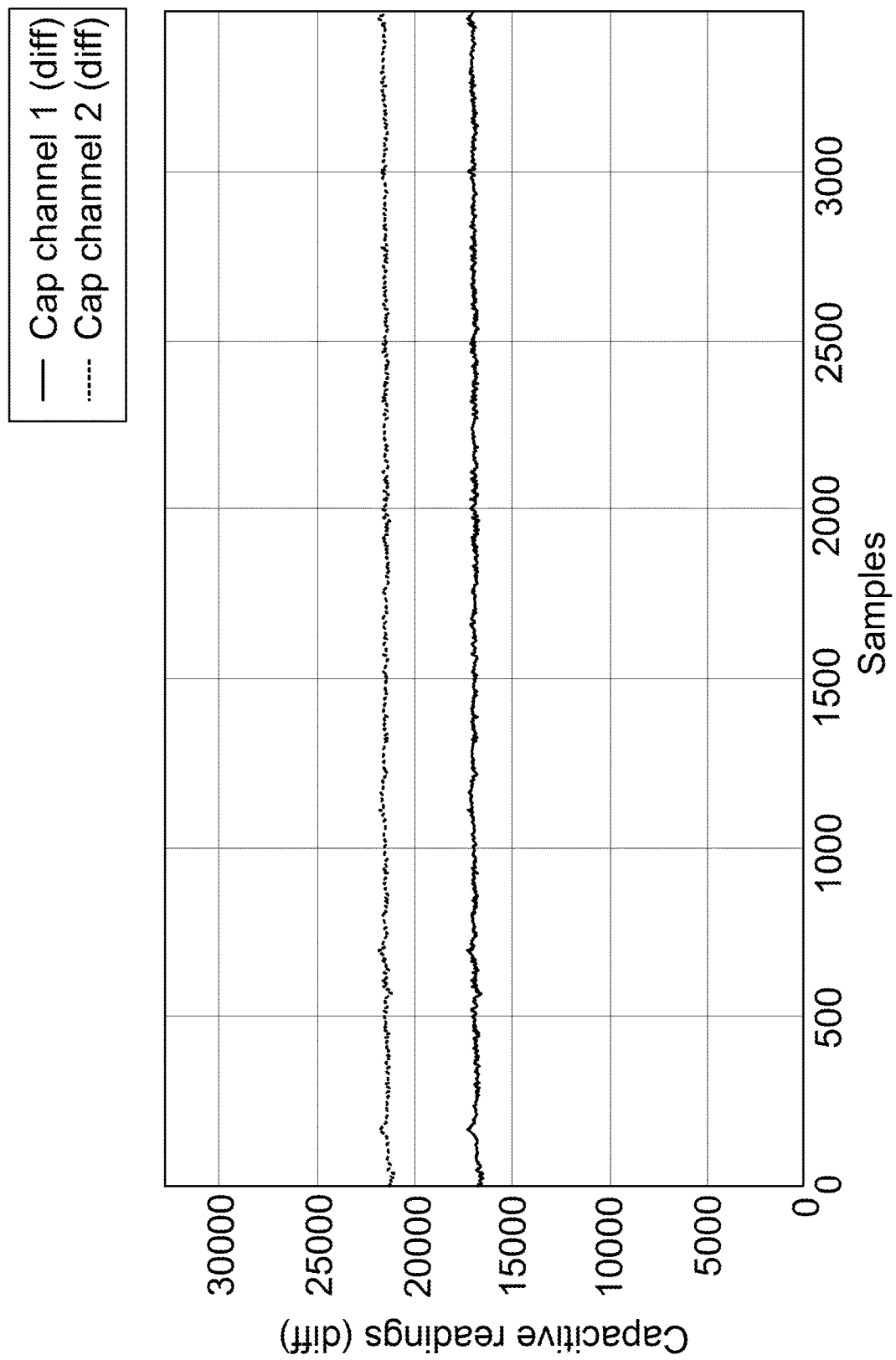
FIGS. 5-9 are plots of output signals from the capacitive SAR sensor corresponding to various user actions, according to a possible implementation of the present disclosure.
Figure 6:
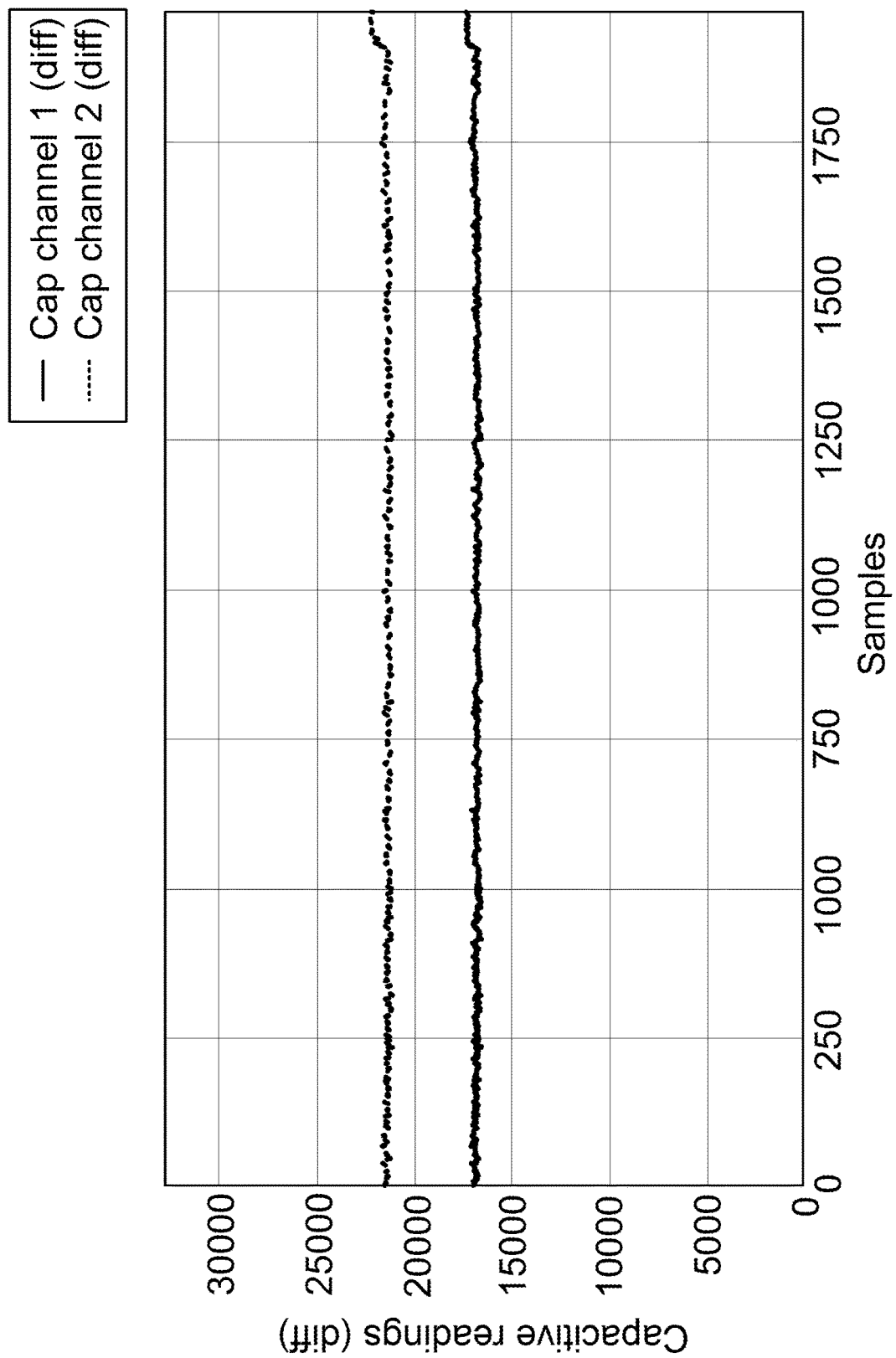
Figure 7:
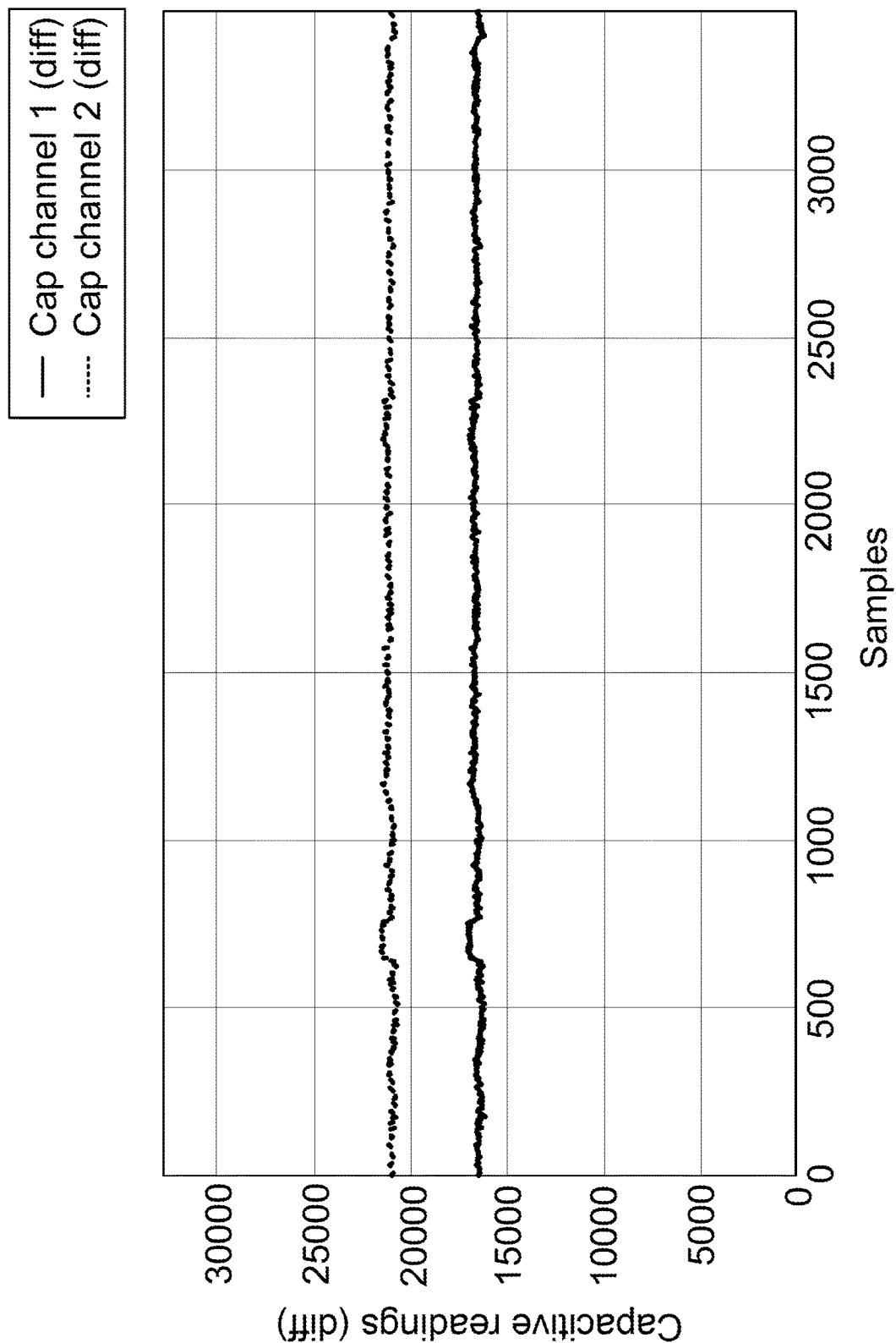
Figure 8:
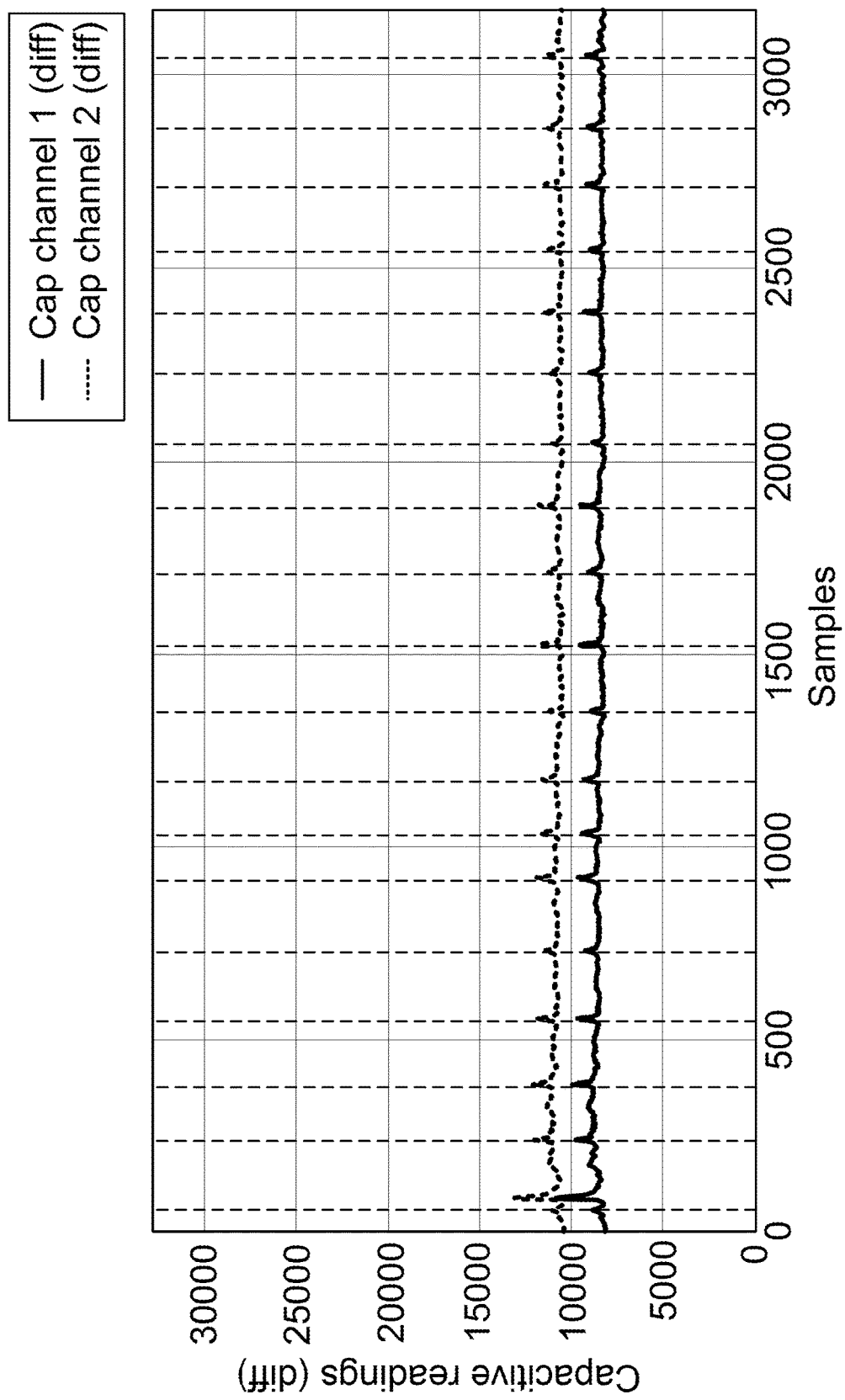
Figure 9:
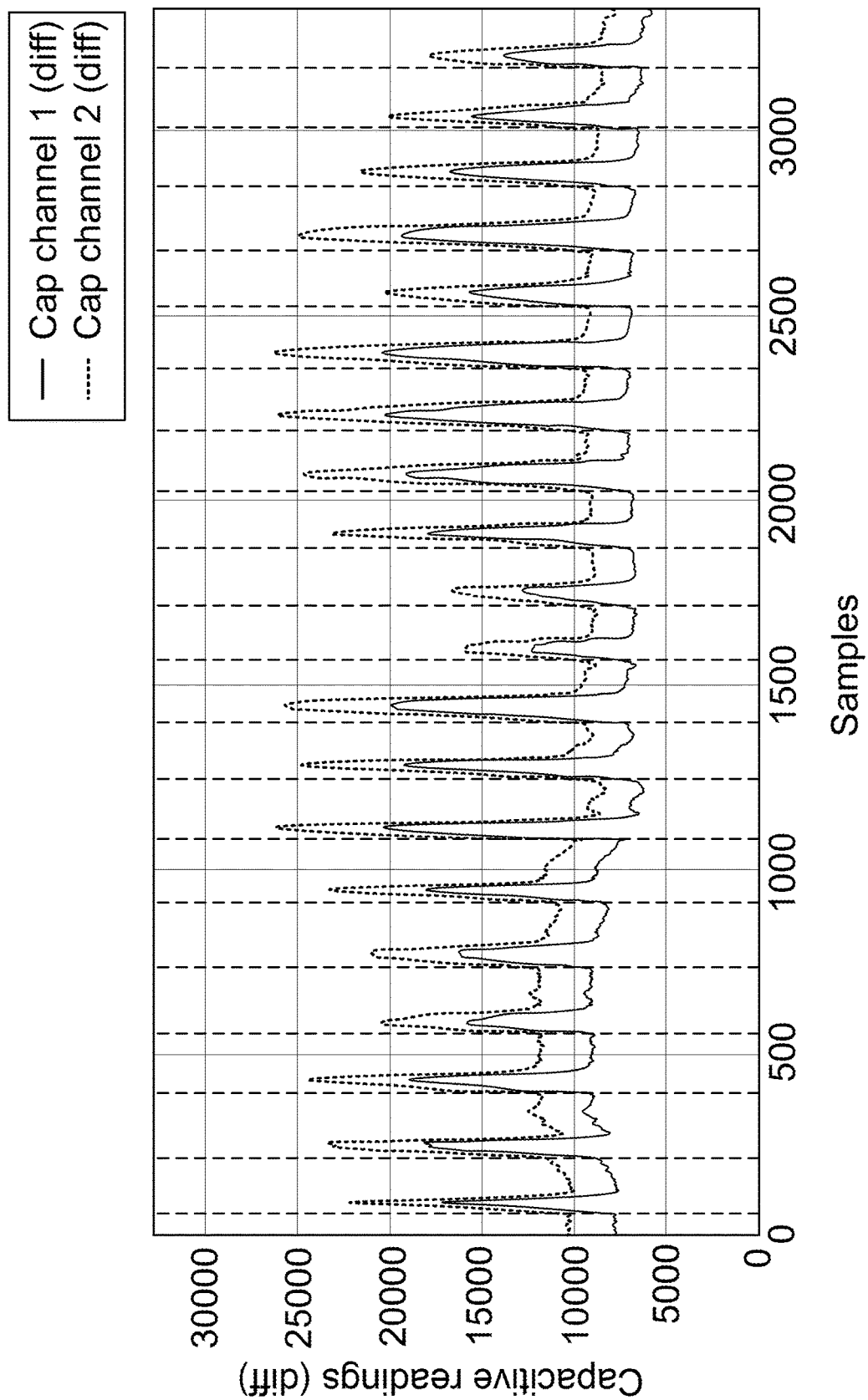

FIGS. 5-9 show plots of signals detected by the capacitive SAR sensor 310B using two differential capacitance channels, according to some implementations of the present disclosure. Each plot shows a time series of differential capacitance measurements from the capacitive SAR sensor 310B, sampled over time. Signals from the two channels are offset from one another to facilitate comparison. FIG. 5 shows differential capacitance measurements taken while the user was walking; FIG. 6 shows differential capacitance measurements taken while the user was speaking; FIG. 7 shows differential capacitance measurements taken while the user's head was moving; FIG. 8 shows differential capacitance measurements taken while the user repeatedly tapped lightly on the arm portion 130; FIG. 9 shows differential capacitance measurements taken while the user repeatedly swiped lightly on the arm portion 130. Compared to the tapping gestures indicated in FIG. 8, the swiping gestures indicated in FIG. 9 are extended in time and have higher amplitude.

Figure 10:
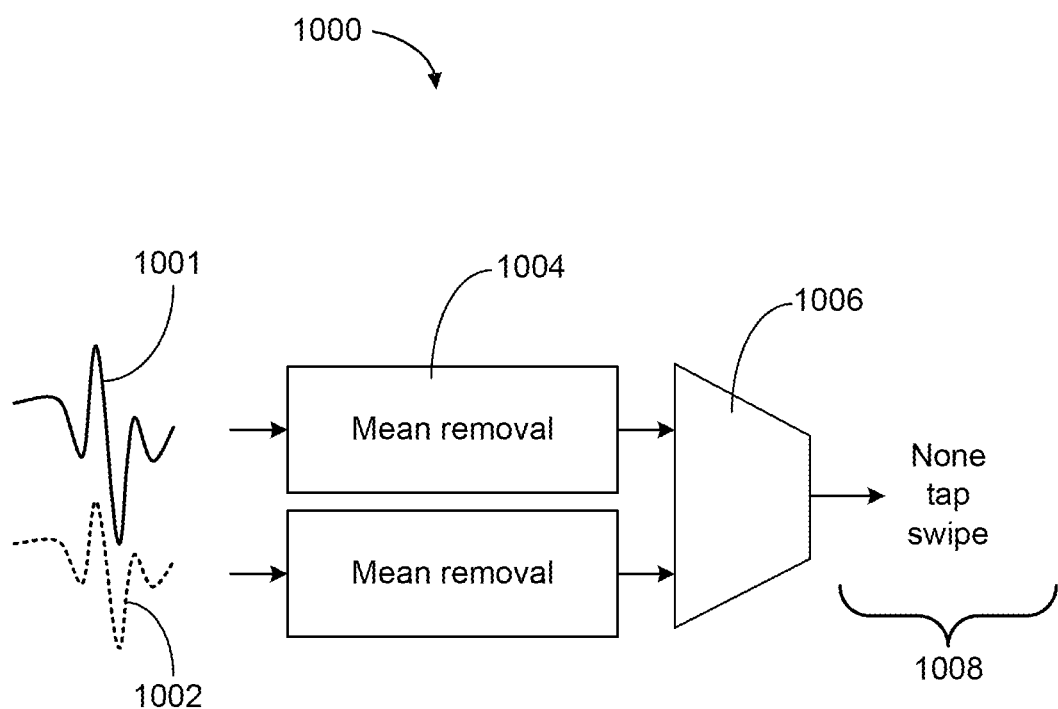
FIG. 10 is a schematic diagram illustrating a neural network model, according to a possible implementation of the present disclosure.

FIG. 10 is a schematic of a convolutional neural network (CNN) model 1000, according to some implementations of the present disclosure. The CNN model 1000 can be used as a tool in prototyping gesture detection. The CNN can be trained to interpret signals from the capacitive SAR sensor 310B and to correlate the signals to various finger gestures. By training the CNN, the capacitive SAR sensor 310B becomes a smart sensor that allows an AR headset to function as an input device. By augmenting the functionality of the capacitive SAR sensor 310B, a touch pad is not needed to receive user input via the AR headset.

In some implementations, each of the channels can use a fixed look-ahead buffer to store signal readings for about 0.2 seconds. A signal 1001 on channel 1 signal and a signal 1002 on channel 2 are each processed by a statistical unit 1004 to extract and remove an average component of the signal, leaving deviations in the signal from the average. A multi-head CNN 1006 can then be used to analyze the deviations to distinguish a tap signal from a swipe signal. In some implementations, the multi-head CNN can have hundreds of parameters, e.g., 680 parameters.

The output of the multi-head CNN 1006 is an identifier 1008 that characterizes a determined state of the touch event as one of three universal gestures: Class 1 ("tap"), Class 2 ("swipe"), or Class 0 ("none"). In accordance with user interface (UI) convention, a tapping gesture can serve as selector input, similar to a mouse click, while a swiping gesture can serve as a scrolling input. A designer of the CNN model 1000 can expand the three-gesture model to include additional gestures. For example, multi-directional swiping gestures can be added to provide a 2-D scrolling input instead of a simple 1-D scrolling input. A 2-D scrolling input and a selecting input are considered to be sufficient to cover the usual range of user inputs. The CNN model 1000 can be further customized, for example, to add a pinch gesture. With each additional gesture, further training of the CNN model 1000 is needed.

Figure 11A:
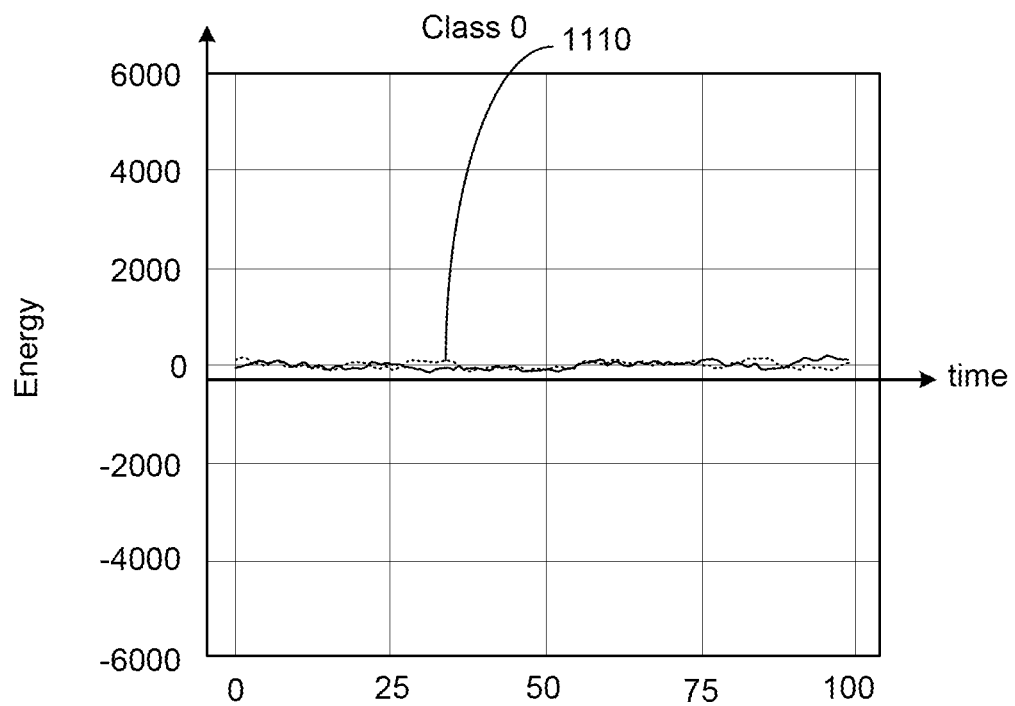
FIGS. 11A, 11B, and 11C are plots of vibrational energy associated with different gestures, according to a possible implementation of the present disclosure.
Figure 11B:
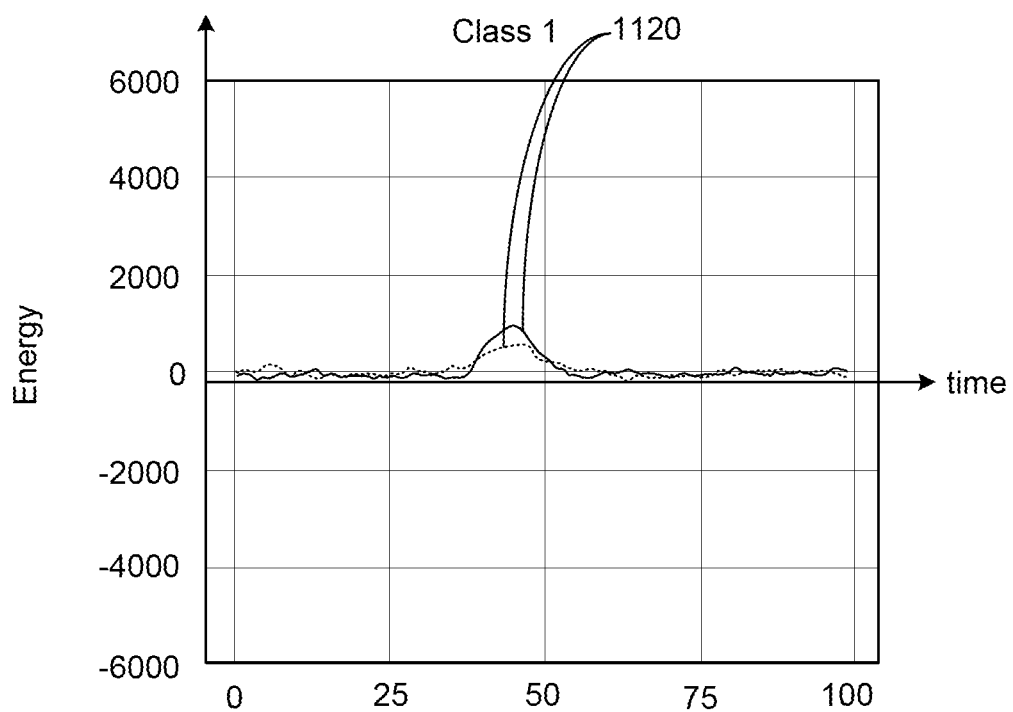
Figure 11C:
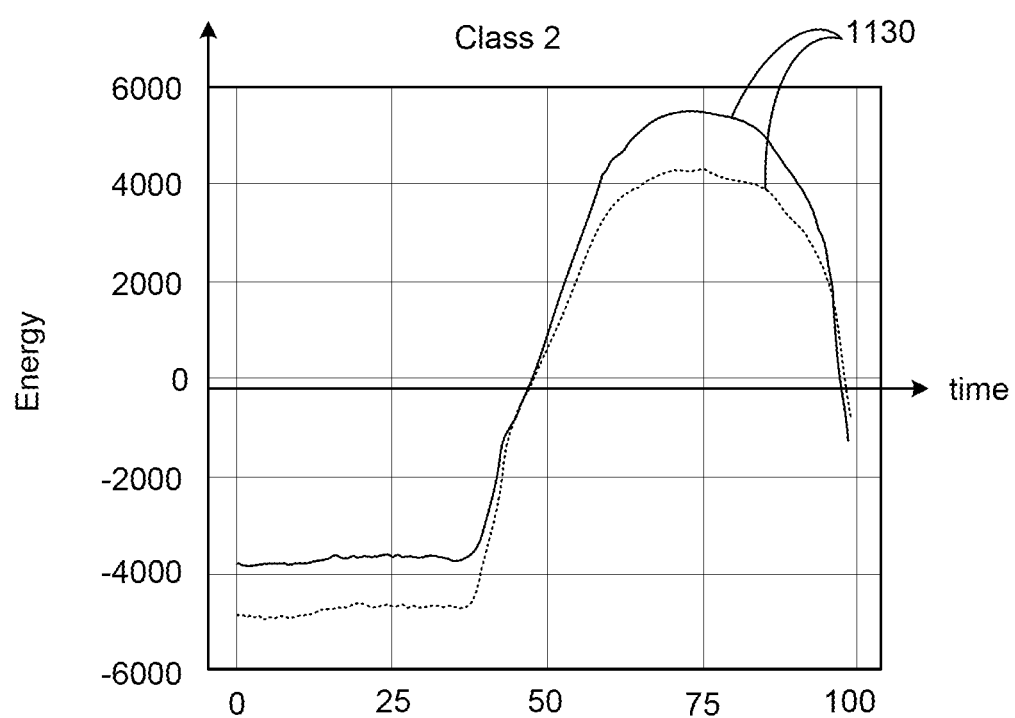

FIGS. 11A, 11B, and 11C are time plots showing vibrational cues for the three different gestures, respectively, according to some implementations of the present disclosure. Each of the plots in FIGS. 11A. 11B, and 11C presents vibrational energy sensed on both channel 1 and channel 2, normalized to an energy value that corresponds to detection of the presence of the user's head 300, e.g., a don/doff baseline signal. The plots in FIG. 11A represent a Class 0 non-gesture, which measures random noise in the absence of frame input. Class 0 signals represent the user walking and/or talking without gesturing. The plots in FIG. 11B represent a Class 1 gesture, or tapping gesture, in which a tapping profile 1120 indicates a quick burst in vibrations of the frame 110 in response to a user tapping on the frame 110. The plots in FIG. 11C represent a Class 2 gesture, or swiping gesture, in which a swiping profile 1130 is extended in time compared with the tapping profile 1120. Channel separation is more pronounced for the swiping profile 1130 than for the tapping profile 1120.

FIGS. 12A and 12B show training confusion matrices 1200 and 1202, respectively, according to some implementations of the present disclosure. The training confusion matrix 1200 contains raw data collected while training the CNN to recognize vibrational cues from rigid body movements of the headset. A total of 424 trials were conducted during the training phase, of which 75 gestures were swiping gestures and 58 were tapping gestures. In the training confusion matrix 1200, column headings refer to the actual gestures, while row headings refer to the CNN's interpretations of the gestures. Ideally, all of the numbers should appear on the diagonal, if the CNN interprets all of the gestures correctly, with no confusion. According to the training confusion matrix 1200, the CNN interpreted 74 of the 75 swiping gestures correctly, but the CNN interpreted one of the swiping gestures as a non-gesture. That is, the CNN failed to register one of the swiping gestures. The CNN interpreted all of the tapping gestures correctly, and did not register any gestures as tapping or swiping when none was intended. FIG. 12B shows normalized data corresponding to the raw data shown in FIG. 12A, thus indicating percentages of success for the CNN interpreting the different gestures during the training phase.

FIGS. 13A and 13B show testing confusion matrices 1300 and 1302, respectively, according to some implementations of the present disclosure. The testing confusion matrix 1300 contains raw data collected while testing the CNN, following the training phase. A total of 366 trials were conducted during the testing phase, of which 47 gestures were swiping gestures and 51 were tapping gestures. In the testing confusion matrix 1300, column headings refer to the actual gestures, while row headings refer to the CNN's interpretations of the gestures. Ideally, all of the numbers should appear on the diagonal, if the CNN interprets all of the gestures correctly, with no confusion. According to the testing confusion matrix 1300, the CNN interpreted all of the 47 swiping gestures correctly. The CNN also interpreted all of the 51 tapping gestures correctly during the testing phase. However, of 268 trials that did not involve a gesture, one instance of false tapping and one instance of false swiping were recorded. FIG. 13B shows normalized data corresponding to the raw data shown in FIG. 13A, thus indicating percentages of success for the CNN interpreting the different gestures during the testing phase.

Figure 14:
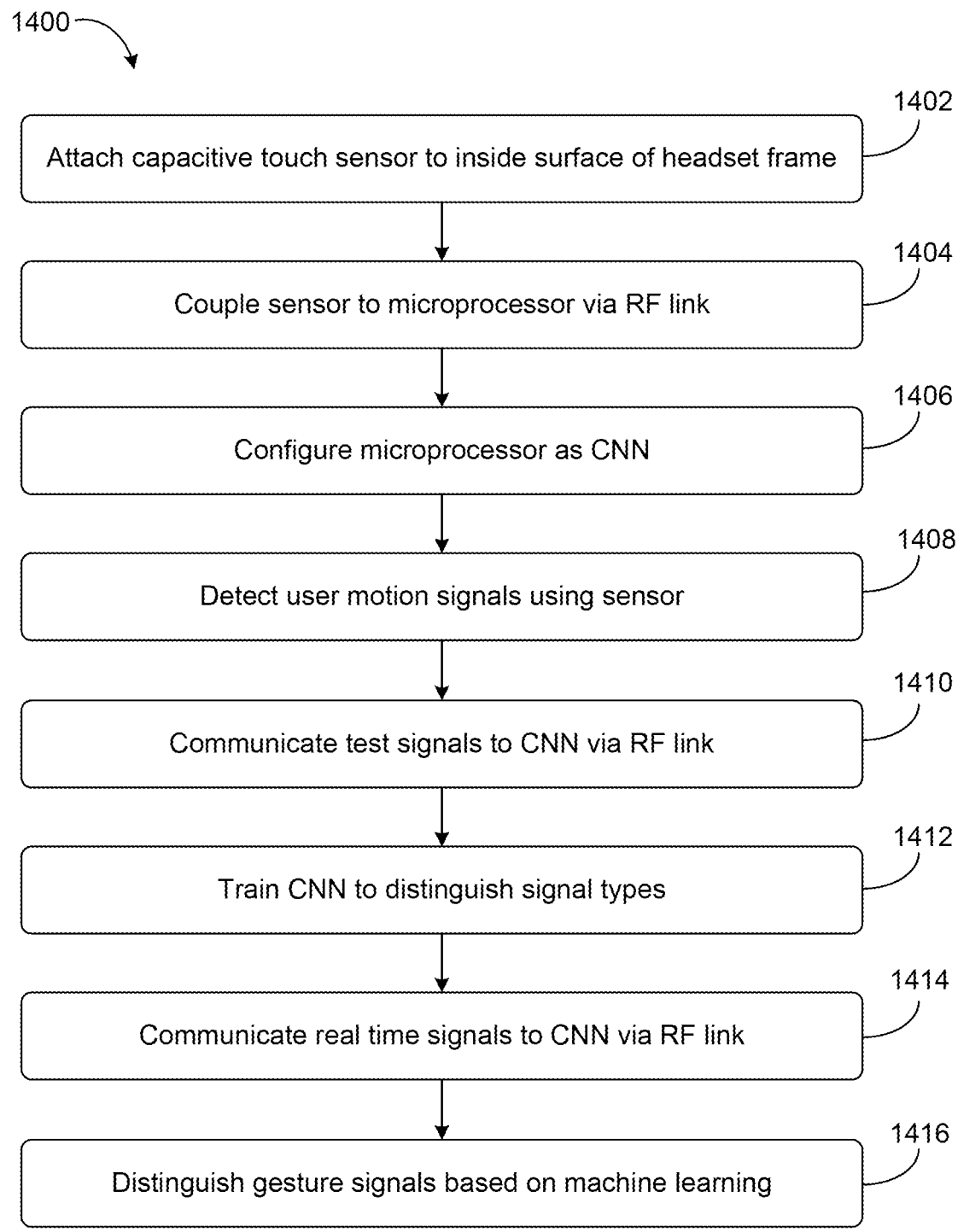
FIG. 14 is a flow chart for a machine learning process according to a possible implementation of the present disclosure.

FIG. 14 is a flow chart illustrating a method 1400 of using a headset as a user interface, according to some implementations of the present disclosure. Operations of the method 1400 can be performed in a different order, or not performed, depending on specific applications. It is noted that the method 1400 may not produce a complete user interface Accordingly, it is understood that additional processes can be provided before, during, or after the method 1400, and that some of these additional processes may be briefly described herein. The operations 1402-1416 can be carried out to transform a headset, e.g., the AR glasses frame 110 into a user interface according to the implementations described above.

At 1402, the method 1400 includes attaching a capacitive touch sensor, e.g., the capacitive SAR sensor 310B to an insider surface of a headset frame, e.g., the frame 110 as shown in FIG. 3B according to some implementations of the present disclosure.

At 1404, the method 1400 includes coupling the capacitive touch sensor to a microprocessor via an RF link, according to some implementations of the present disclosure. The microprocessor can be, for example, a microprocessor of the controller 115, or an external microprocessor, e.g., the processor 1504 described below. In some implementations, the RF link can be provided by the communications module 117.

At 1406, the method 1400 includes configuring the microprocessor as a convolutional neural network (CNN), according to some implementations of the present disclosure. In some implementations, the microprocessor can be configured using the CNN model 1000.

At 1408, the method 1400 includes detecting user motion signals using the capacitive touch sensor, according to some implementations of the present disclosure. The user motion signals can include signals containing vibrational cues indicating gestures as shown in FIG. 8. FIG. 9, FIG. 11B, and FIG. 11C.

At 1410, the method 1400 includes communicating a set of user motion signals as test signals to the CNN via the RF link, according to some implementations of the present disclosure.

At 1412, the method 1400 includes training the CNN to distinguish signal types, as shown in FIGS. 12A and 12B, according to some implementations of the present disclosure. Training results can be assessed by constructing training confusion matrices 1200 and 1202.

At 1414, the method 1400 includes communicating real time signals to the CNN via the RF link according to some implementations of the present disclosure.

At 1416, the method 1400 includes distinguishing gesture signals based on machine learning as illustrated in FIGS. 13A and 13B, according to some implementations of the present disclosure. Testing results can be assessed by constructing testing confusion matrices 1300 and 1302.

Figure 15:
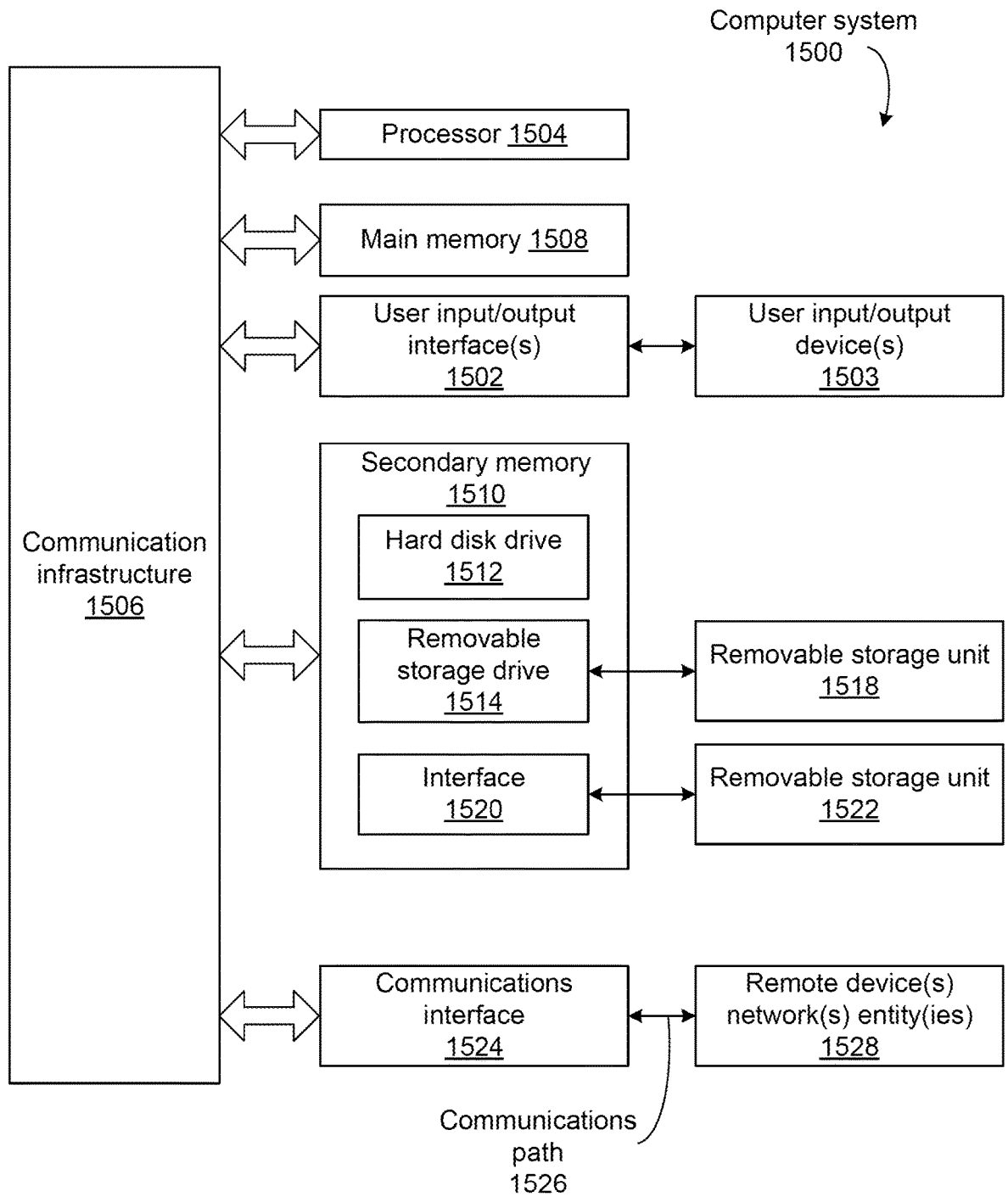
FIG. 15 is a system block diagram of a computer system for implementing the neural network model according to a possible implementation of the present disclosure.

FIG. 15 is an illustration of an example computer system 1500 in which various embodiments of the present disclosure can be implemented. The computer system 1500 can be any well-known computer capable of performing the functions and operations described herein. For example, and without limitation, the computer system 1500 can provide a hardware platform for implementing the CNN model described above. The computer system 1500 can be used, for example, to execute one or more operations in the method 1400, which describes an example method for using a headset as a user interface.

The computer system 1500 includes one or more processors (also called central processing units, or CPUs), such as a processor 1504. The processor 1504 is connected to a communication infrastructure or bus 1506. The computer system 1500 also includes input/output device(s) 1503, such as monitors, keyboards, pointing devices, etc., that communicate with a communication infrastructure or bus 1506 through input/output interface(s) 1502. The processor 1504 can receive instructions to implement functions and operations described herein—e.g., method 1400 of FIG. 14—via input/output device(s) 1503. The computer system 1500 also includes a main or primary memory 1508, such as random access memory (RAM). The main memory 1508 can include one or more levels of cache. The main memory 1508 has stored therein control logic (e.g., computer software) and/or data. In some embodiments, the control logic (e.g., computer software) and/or data can include one or more of the operations described above with respect to the method 1400 of FIG. 14.

The computer system 1500 can also include one or more secondary storage devices or secondary memory 1510. The secondary memory 1510 can include, for example, a hard disk drive 1512 and/or a removable storage device or drive 1514. The removable storage drive 1514 can be a floppy disk drive, a magnetic tape drive, a compact disk drive, an optical storage device, tape backup device, and/or any other storage device/drive.

The removable storage drive 1514 can interact with a removable storage unit 1518. The removable storage unit 1518 includes a computer usable or readable storage device having stored thereon computer software (control logic) and/or data. The removable storage unit 1518 can be a floppy disk, magnetic tape, compact disk, DVD, optical storage disk, and/any other computer data storage device. The removable storage drive 1514 reads from and/or writes to removable storage unit 1518 in a well-known manner.

According to some embodiments, the secondary memory 1510 can include other means, instrumentalities or other approaches for allowing computer programs and/or other instructions and/or data to be accessed by the computer system 1500. Such means, instrumentalities or other approaches can include, for example, a removable storage unit 1522 and an interface 1520. Examples of the removable storage unit 1522 and the interface 1520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface. In some embodiments, the secondary memory 1510, the removable storage unit 1518, and/or the removable storage unit 1522 can include one or more of the operations described above with respect to the method 1400 of FIG. 14.

The computer system 1500 can further include a communication or network interface 1524. The communication interface 1524 enables the computer system 1500 to communicate and interact with any combination of remote devices, remote networks, remote entities, etc. (individually and collectively referenced by remote devices 1528). For example, the communication interface 1524 can allow the computer system 1500 to communicate with the remote devices 1528 over communications path 1526, which can be wired and/or wireless, and which can include any combination of LANs, WANs, the Internet, etc. Control logic and/or data can be transmitted to and from the computer system 1500 via the communication path 1526.

The operations in the preceding embodiments can be implemented in a wide variety of configurations and architectures. Therefore, some or all of the operations in the preceding embodiments—e.g., the method 1400 of FIG. 14—can be performed in hardware, in software or both. In some embodiments, a tangible apparatus or article of manufacture comprising a tangible computer useable or readable medium having control logic (software) stored thereon is also referred to herein as a computer program product or program storage device. This includes, but is not limited to, the computer system 1500, the main memory 1508, the secondary memory 1510 and the removable storage units 1518 and 1522, as well as tangible articles of manufacture embodying any combination of the foregoing. Such control logic, when executed by one or more data processing devices (such as the computer system 1500), causes such data processing devices to operate as described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

What is claimed is:

1. A headset, comprising:
    a headset frame including an arm portion having an inside surface and an outside surface;
    a touch sensor coupled to the inside surface of the arm portion, to sense user gestures on the outside surface of the arm portion; and
    a microprocessor configured as a neural network to
        detect the user gestures; and
        distinguish multiple types of user gestures from one another based on machine learning.

2. The headset of claim 1, wherein the inside surface is located adjacent to a user's head when the headset is worn by the user.

3. The headset of claim 1, wherein the headset frame is one of a glasses frame or a goggles frame suitable for use in one or more of an augmented reality system or a virtual reality system.

4. The headset of claim 1, wherein the neural network is a convolutional neural network (CNN).

5. The headset of claim 1, wherein the rigid headset frame is made of a material that includes at least one of a plastic material, a nylon material, or a carbon fiber material.

6. The headset of claim 1, wherein the touch sensor includes at least one of a capacitive specific absorption rate (SAR) sensor, an optical proximity sensor, or a microphone.

7. The headset of claim 1, further comprising a radio frequency communication device coupled to the touch sensor.

8. The headset of claim 1, wherein the touch sensor is configured as an on/off switch that controls an operational state of the headset.

9. The headset of claim 1, wherein the touch sensor includes a copper backplate.

10. A system, comprising:
    a headset;
    a capacitive sensor mounted to an inside surface of the headset, the inside surface located adjacent to a user's head when the headset is worn by a user, wherein the capacitive sensor is configured to sense user gestures on an outside surface of the headset, and user movements;
    a radio frequency (RF) communication device coupled to the capacitive sensor, the RF communication device configured to transmit RF signals representing the user movements and the user gestures; and
    a microprocessor communicatively coupled to the capacitive sensor by the RF communication device, the microprocessor programmed with a neural network configured to interpret the RF signals received from the capacitive sensor.

11. The system of claim 10, wherein the RF signals are transmitted on each of two channels.

12. The system of claim 10, wherein the capacitive sensor is a specific absorption rate (SAR) sensor.

13. The system of claim 10, wherein the neural network is configured to distinguish between a gesture signal and a head movement signal.

14. The system of claim 13, wherein the neural network is configured to distinguish between a tap gesture signal and a swipe gesture signal.

15. A method, comprising:
    attaching a capacitive touch sensor to an inside surface of a headset frame;
    coupling the capacitive touch sensor to a microprocessor via a radio frequency (RF) link;
    configuring the microprocessor as a CNN;
    detecting user motion signals via the capacitive touch sensor;
    communicating a set of user motion signals as test signals to the CNN via the RF link; and
    using machine learning, training the CNN to distinguish from among different types of test signals.

16. The method of claim 15, wherein training the CNN includes constructing confusion matrices corresponding to the different types of test signals.

17. The method of claim 15, wherein the different types of test signals include at least one of head motion signals or gesture signals.

18. The method of claim 17, wherein the gesture signals include at least one of tap gestures or swipe gestures.

19. The method of claim 17, wherein the head motion signals include at least one of walking motion signals or talking motion signals.

20. The method of claim 15, further comprising:
    communicating real time user motion signals to the CNN via the RF link; and
    distinguishing head motion signals from gesture signals based on the machine learning.

* * * * *

UNITED STATES PATENT AND TRADEMARK OFFICE
CERTIFICATE OF CORRECTION

PATENT NO. : 12,210,703 B1  
APPLICATION NO. : 18/361457  
DATED : January 28, 2025  
INVENTOR(S) : Shin et al.

Page 1 of 1

It is certified that error appears in the above-identified patent and that said Letters Patent is hereby corrected as shown below:

In the Claims

In Column 11, Claim 5, Line 44, after "the" delete "rigid".

Signed and Sealed this  
Fourth Day of November, 2025

John A. Squires  
*Director of the United States Patent and Trademark Office*